US012773651B2

(12) United States Patent
Mustakangas et al.

(10) Patent No.: US 12,773,651 B2
(45) Date of Patent: Oct. 27, 2026

(54) FILTRATE VAT ASSEMBLY FOR A FILTER PRESS

(71) Applicant: Metso Finland Oy, Espoo (FI)

(72) Inventors: Mirva Mustakangas, Pirkkala (FI); Ismo Juvonen, Rauha (FI); Janne Kaipainen, Halsua (FI); Teemu Eloranta, Luumäki (FI)

(73) Assignee: Metso Finland Oy, Espoo (FI)

( * ) Notice: Subject to any disclaimer, the term of this patent is extended or adjusted under 35 U.S.C. 154(b) by 610 days.

(21) Appl. No.: 18/258,352

(22) PCT Filed: Dec. 23, 2020

(86) PCT No.: PCT/FI2020/050865
§ 371 (c)(1),
(2) Date: Jun. 20, 2023

(87) PCT Pub. No.: WO2022/136723
PCT Pub. Date: Jun. 30, 2022

(65) Prior Publication Data
US 2024/0033661 A1 Feb. 1, 2024

(51) Int. Cl.
*B01D 25/21* (2006.01)
*B01D 25/30* (2006.01)

(52) U.S. Cl.
CPC ........... *B01D 25/215* (2013.01); *B01D 25/30* (2013.01)

(58) Field of Classification Search
CPC .... B01D 25/215; B01D 25/30; B01D 25/305; B01D 25/1275; B01D 25/164; B01D 25/12
See application file for complete search history.

(56) References Cited

U.S. PATENT DOCUMENTS 1,891,396 A 12/1932 Prutzman
3,655,056 A 4/1972 Schotten
4,826,593 A * 5/1989 Nev .................... B01D 25/285 210/231

(Continued)

FOREIGN PATENT DOCUMENTS

CH 386988 A 1/1965
CN 101678248 A 3/2010

(Continued)

OTHER PUBLICATIONS

Supplementary Search Report for EP Application No. 20966764, dated Aug. 7, 2024.

(Continued)

*Primary Examiner* — Liam Royce
(74) *Attorney, Agent, or Firm* — Andrus Intellectual Property Law, LLP

(57) ABSTRACT

A filtrate vat assembly for a filter press, including a filtrate vat defining a receptacle being laterally delimited by a border elevated from a base of the receptacle and open towards a side opposing the base. A gap is provided on the border, such that an outlet opening extending laterally through the border is formed, thereby providing a fluid drainage route from the receptacle, the gap being open towards the side opposing the base. The filtrate vat assembly further includes a lid covering the outlet opening from the side opposing the base, such that the outlet opening is delimited by the border and the lid.

15 Claims, 4 Drawing Sheets

(56) References Cited

U.S. PATENT DOCUMENTS

| | | | | |
|---|---|---|---|---|
| 5,045,191 | A | 9/1991 | Fresenius | |
| 6,716,347 | B1 * | 4/2004 | Davis | B01D 25/285<br>210/231 |
| 7,754,078 | B2 | 7/2010 | Gaudfrin | |
| 2010/0163476 | A1 | 7/2010 | Bonn | |
| 2019/0015764 | A1 | 1/2019 | Partti | |

FOREIGN PATENT DOCUMENTS

| | | | |
|---|---|---|---|
| CN | 105126401 | A | 12/2015 |
| CN | 106345157 | B | 9/2018 |
| CN | 110124371 | A | 8/2019 |
| CN | 113750595 | A | 12/2021 |
| CN | 218166084 | U | 12/2022 |
| DE | 202010002570 | U1 | 6/2010 |
| ES | 2379276 | T3 | 4/2012 |
| GB | 645586 | A | 11/1950 |
| GB | 907503 | A | 10/1962 |
| WO | 2021245322 | A1 | 12/2021 |

OTHER PUBLICATIONS

Office Action for Chinese Patent Application No. 202111589231.7, mailed Jun. 6, 2025.

International Search Report and Written Opinion for International Application No. PCT/FI2020/050865, mailed Jun. 11, 2021.

Office Action for corresponding Chinese Utility Model Application No. 202123275684.0, mailed Apr. 28, 2022.

First Examination Report for Indian Patent Application 202317038803, dated Aug. 11, 2026.

* cited by examiner

FILTRATE VAT ASSEMBLY FOR A FILTER PRESS

CROSS-REFERENCE TO RELATED APPLICATIONS

This application is the U.S. national stage application of International Application PCT/FI2020/050865, filed Dec. 23, 2020, which international application was published Jun. 30, 2022, as International Publication WO 2022/136723 A1 in the English language.

FIELD OF THE DISCLOSURE

The present disclosure relates to filter presses, and more particularly, to a filtrate vat arrangement for such a filter.

BACKGROUND OF THE DISCLOSURE

In conventional filter presses, a filtrate vat is used to collect filtrate received through a filter medium from an adjacent filter chamber. Filtrate is then drained from the filtrate vat through an opening formed on a wall of a receptacle forming the filtrate vat.

Particularly the region of the filtrate outlet is susceptible to premature wear caused by the abrasive nature of the finer particles carried by the filtrate, and a possible subsequent drying air flow. To this end, the filtrate vat has typically been formed of a wear-resistant material. However, it has been noticed, that such wear resistant materials are prone to creeping as it is repetitively compressed over numerous filtration cycles. Creeping of the vat subsequently leads to problems related to sealing the filtrate vat against an adjacent filter plate assembly. Creeping of the filtrate vat is particularly prominent at the filtrate outlet, as the opening itself constitutes a region of weakened structural strength of the filtrate vat. Worn filtrate vats have thus been replaced after becoming excessively deformed. Moreover, it has not been generally considered feasible to change the material of the filtrate vat so as to better resist deformation due to creeping, because this has been considered to result in unsatisfactory wear-resistance characteristics.

Furthermore, the outlet opening has been found to typically form a bottleneck in the filtration process, i.e. cycle times of the filtration process has been restricted by the limited flow rate through the outlet openings in conventional arrangements. Increasing the size of the outlet opening has not generally been considered feasible, as this would even further accelerate creeping of the filtrate vat at the outlet region.

BRIEF DESCRIPTION OF THE DISCLOSURE

An object of the present disclosure is to provide a filtrate vat assembly having an increased operational life. The object of the disclosure is achieved by a filtrate vat assembly characterized by what is stated in the independent claim. The preferred embodiments of the disclosure are disclosed in the dependent claims.

The disclosure is based on the idea of providing the outlet opening of a filtrate vat assembly as a gap formed on the border delimiting the receptacle of the vat together with a separate lid. This allows multiple improvements contributing towards increasing the operational life of the filtrate vat assembly, particularly the aspects thereof related to the outlet opening.

Firstly, providing the outlet opening with a separate lid allows the shape and form of the outlet opening itself to be formed more freely, allowing enhanced flow characteristics as compared to conventional outlet opening provided as drilled through holes. This translates into both improved filtrate flow rates and less flow resistance. Furthermore, drainage of the filtrate from the filtrate vat has previously been a bottleneck in the filtration process. Consequently, a separate lid of the filtrate outlet allowing an improved flow rate also improves cycle times of the filtration cycles. The decreased flow resistance allowed by more freely formed shape and form of the outlet opening, in turn, results in less wear of the outlet opening caused by the abrasive nature of the filtrate.

Secondly, the lid may be provided of a different material than the remaining outlet opening or filtrate vat, thus improving the resistance against creeping of the filtrate vat assembly at the filtrate outlet region. This greatly improves the longevity of the filtrate vat assembly, because the filtrate outlet region has conventionally been particularly susceptible of creeping.

According to a first aspect of the present disclosure, a filtrate vat assembly for a filter press is provided. The filtrate vat assembly comprises a filtrate vat defining a receptacle being laterally delimited by a border elevated from a base of the receptacle. Particularly, the vat is arranged for receiving filtrate from an adjacent filter chamber, when in use. Moreover, the receptacle is open towards a side opposing the base. That is, should the filtrate vat be arranged horizontally, such that the base constitutes a bottom, the receptacle is open towards an upper side of the filtrate vat. However, the filtrate vat may be arranged alternatively, e.g. vertically.

A gap is provided on the border, such that an outlet opening extending laterally through the border is formed. The gap thereby provides a fluid drainage route from the receptacle. Furthermore, the gap is open towards the side opposing the base.

Particularly, the filtrate vat assembly further comprises a lid covering the outlet opening from the side opposing the base. Consequently, the outlet opening is delimited by the border and the lid.

In an embodiment according to the first aspect of the disclosure, a recess is formed on a surface of the border facing the side opposing the base, adjacent to the gap. In other words, the border has a lower elevation form the base at a region adjacent to the gap, than at other regions of the border. Moreover, the lid is received into the recess, so that a surface of the lid facing the side opposing the base is flush with a surface of the border adjacent to the recess.

Preferably, but not necessarily, the lid 5 has a shape corresponding to that of the recess **3*b*, such that recess 3*b* form-fittingly accommodates the lid 5** therein. Furthermore, the recess may be provided on both sides of the gap. That is, the recess may extend over the gap along with the lid.

In another embodiment according to the first aspect of the disclosure, the lid is formed of a creep-resistant material, preferably chosen from a group comprising metals, FRP (fibre-reinforce plastics) materials, and thermoset materials. An exemplary realisation of metals is steel, whereas examples of FRP materials include reinforced composite materials with a thermoset or thermoplastic matric.

In another embodiment according to the first aspect of the disclosure, at least a side of the lid facing the outlet opening is coated with a wear-resistant material, preferably chosen from a group comprising wear resistant polymers, such as thermoplastics, PUR and rubber. Particularly, examples of such thermoplastics include thermoplastic vulcanizates and thermoplastics elastomers.

For example, such a wear-resistant coating may be provided in the form of a gasket provided on the side of the lid facing the outlet opening. Such a gasket may then be shaped to conform with that of the lid itself. That is, the gasket may have holes to accommodate any projections or openings of the lid, such as ribs, attachment openings or attachment studs.

Preferably, but not necessarily, if a recess is provided adjacent to the gap of the border, the recess is provided with a sealing groove running along a lengthwise direction of the border at the position of the recess. Suitably, the sealing groove may be arranged transverse to an anticipated force exerted on the border by a filtration pressure during operation. In such a case where a sealing groove is provided, the gasket may further be provided with a sealing ridge corresponding to the sealing groove, such that the former is received within the latter. Suitably, such sealing grooves and sealings ridges may be provided as two or more parallel grooves and ridges, respectively. Furthermore, the sealing ridge and the sealing groove may advantageously be provided on both sides of the gap.

In another embodiment according to the first aspect of the disclosure, the lid further comprises one or more ribs projecting from a side facing the outlet opening and extending between opposing lateral ends of the outlet opening.

Such ribs effectively guide filtrate flow within the outlet opening, thereby reducing the formation of vortices and turbulent flow, further resulting in an increased flow rate and less wear.

In another embodiment according to the first aspect of the disclosure, a surface of the border facing the side opposing the base is provided with one or more attachment studs adjacent to the gap. Correspondingly, the lid is provided with one or more attachment openings corresponding to the shape and position of the attachment studs. Moreover, the attachment studs are received within the attachment openings so as to secure position and alignment of the lid with respect to the outlet opening.

Preferably, but not necessarily, two attachment studs and attachment openings are provided, one on each side of the gap.

In an alternative embodiment according to the first aspect of the disclosure, a surface of the border facing the side opposing the base is provided with one or more attachment openings adjacent to the gap. Correspondingly, the lid is provided with one or more attachment studs corresponding to the shape and position of the attachment openings. Moreover, the attachment studs are received within the attachment openings so as to secure the position and alignment of the lid with respect to the outlet opening.

Preferably, but not necessarily, a laterally outer surface of the border, adjacent to the gap, is equipped with a first locking hole extending up to the attachment opening. Moreover, the attachment stud received within said attachment opening is equipped with a second locking hole. The first locking hole and the second locking hole are aligned and parallel with respect to each other, such that a locking pin inserted into the second locking hole through the first locking hole secures the lid in place.

Preferably, but not necessarily, two attachment studs and attachment openings are provided, one on each side of the gap. In such a case, two first locking holes are advantageously provided, one on each side of the gap. Both attachment studs are may then be provided with respective second locking holes, and pins may be inserted into both second locking holes through respective first locking holes.

Regardless of the number of locking pins and associated first and second locking holes, one or more locking pins may advantageously be threadedly engaged with a respective second locking hole.

Preferably, but not necessarily, a collector element for receiving filtrate form the outlet opening is attached to the remaining filtrate vat assembly with pins protruding from the first locking hole. In such a case, the collector element is suitably secured in place with one or more bolts threadedly engaging with a distal end of the locking pin.

In another embodiment according to the first aspect of the disclosure, the vat assembly is configured to be suitable for a horizontal filter press, such as a tower press (i.e. having the filter chambers extending in the horizontal direction). In such a case, the base of the filtrate vat forms a bottom thereof, and the side opposing the base constitutes an upper side, when in use.

Nevertheless, it should be noted that the present disclosure may equally well be implemented in connection with other types of filters, such as a filter press having vertical filter chambers.

Moreover, it should be noted that the present disclosure encompasses any combination of one or more embodiments, or variants thereof, as discussed above.

According to a second aspect of the present disclosure, a filter press is provided. Particularly, the filter press comprises one or more filtrate vat assemblies according to the first aspect of the present disclosure.

In an embodiment according to the second aspect of the present disclosure, the filter press comprises a plurality of filter plates configured movable towards each other into a closed position in which a filter chamber is formed by adjacent plate frame assemblies, and away from each to an open position in which adjacent filter plates are spaced apart from each other. A translation arrangement is provided for moving the filter plates towards each other so as to form a filter chamber, and away from each other so as to open the filter chamber.

The filter press further comprises a filter medium arranged between adjacent filter plates, a feed arrangement for feeding slurry into the filter chamber and a discharge arrangement for discharging a filter cake formed within the filter chamber.

Particularly one or more filter plates are equipped with a filtrate vat assembly according the first aspect of the present disclosure, such that filtrate is received by the filtrate vat from an adjacent filter chamber.

Moreover, the filter press may be provided as a horizontal filter press, such as a tower press. That is, the filter plate may be provided in a horizontally extending configuration. However, the filter plates may alternatively be provided in a vertically extending configuration.

BRIEF DESCRIPTION OF THE DRAWINGS

In the following the disclosure will be described in greater detail by means of preferred embodiments with reference to the accompanying drawings, in which

FIG. 7 illustrates the outlet region of FIG. 3 as a perspective view in an assembled configuration, according to an alternative embodiment of the present disclosure, and.

DETAILED DESCRIPTION OF THE DISCLOSURE

Figure 1:
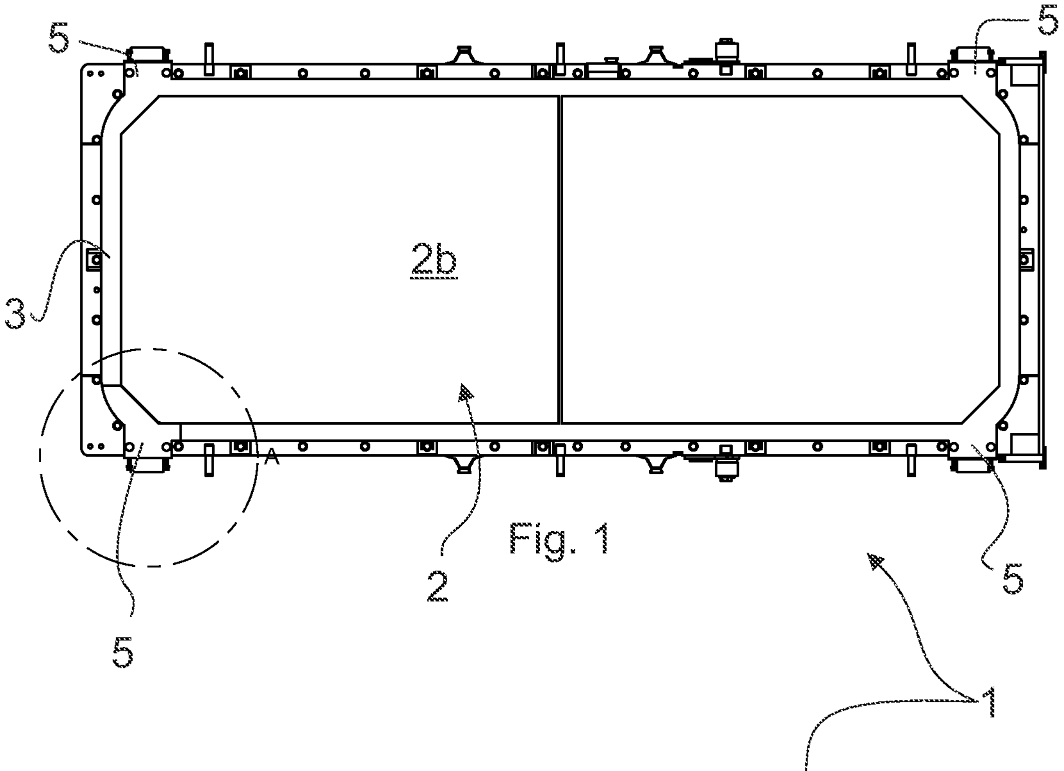
FIG. 1 illustrates a plan view of filtrate vat assembly according to an embodiment of the present disclosure, as seen from the side opposing the base.

FIG. 1 illustrates a plan view of a filtrate vat assembly 1 according to an embodiment of the present disclosure, as seen from the side 1*a* opposing the base 2*b* of the filtrate vat 2. Particularly, the filtrate vat 2 defines a receptacle 2*a* for receiving filtrate from an adjacent filter chamber, when in use. The receptacle 2 is delimited by a border 3, which is elevated from a base 2*b* of the receptacle 2. The border 3 has gaps 3*a* forming filtrate outlets 4 (although not visible in FIG. 1, as the outlet openings 4 are covered by associated lids 5). In the embodiment of FIG. 1, the filtrate vat 2 has a generally rectangular shape, where gaps 3*a* of the border 3 forming outlet openings 4 covered by lids 5 are provided at each corner region of the rectangular shape. It should be noted the present disclosure also encompasses alternative number and/or positions of the outlet openings 4.

Figure 2:
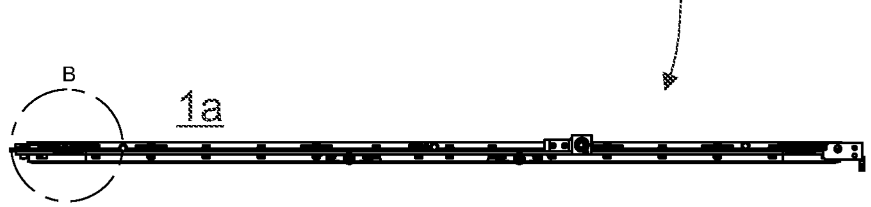
FIG. 2 illustrates a plan view of filtrate vat assembly according to an embodiment of the present disclosure, as seen from a lateral side thereof.

FIG. 2 illustrates a plan view of filtrate vat assembly according to the embodiment of FIG. 1, as seen from a lateral side thereof. Particularly, reference numeral 1*a* clearly indicates the side opposing the base 2*a*.

Figure 3:
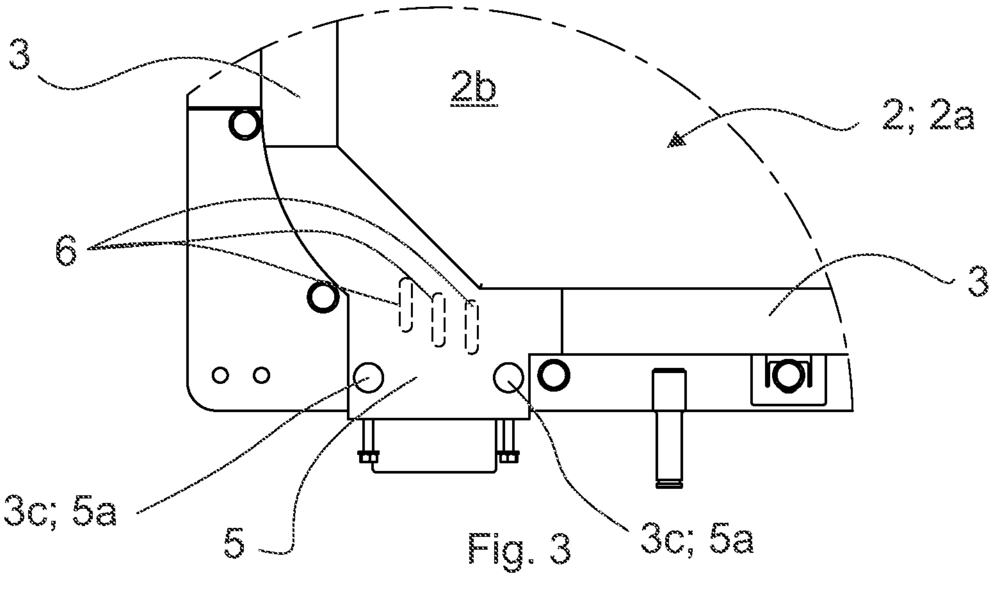
FIG. 3 illustrates a detailed view of an outlet region encircled with a dot-dashed line in FIG. 1.

FIG. 3 illustrates a detailed view of an outlet region encircled with a dot-dashed line in FIG. 1. Schematically illustrated with dashed lines, the ribs 6 (provided on the side not shown in FIG. 3 of the lid 5 facing towards the outlet opening) extend between opposing lateral ends of the outlet opening 4.

Figure 4:
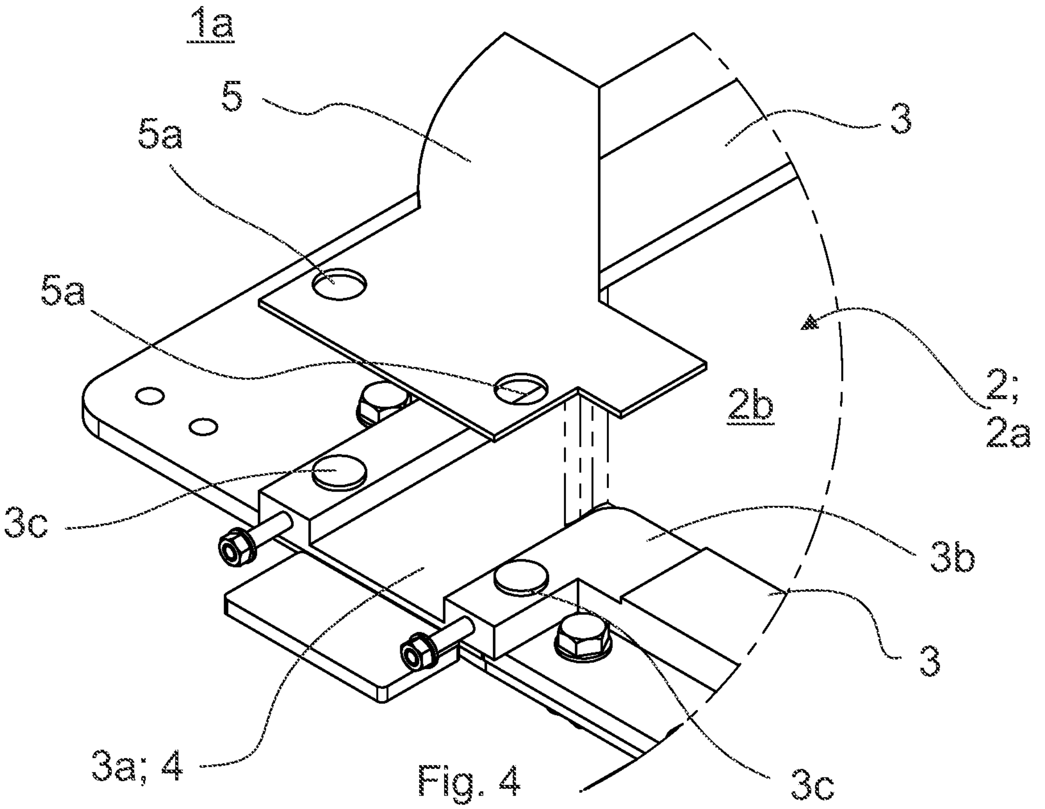
FIG. 4 illustrates the outlet region of FIG. 3 as a perspective view in an exploded configuration.

FIG. 4, in turn, illustrates the outlet region of FIG. 3 as a perspective view in an exploded configuration, i.e., the lid 5 being detached from the outlet opening 4. Moreover FIG. 4 even more clearly illustrates the border 3 delimiting the receptacle 2*a*, and being elevated from the base 2*b* thereof. Moreover, FIG. 3 illustrates a recess 3*b* on a surface of the border 3 facing the side 1*a* opposing the base 2*b*, provided adjacent to the gap 3*a* forming the outlet opening 4. Additionally, FIG. 4 shows attachment openings 5*a* of the lid 5 extending therethrough. Particularly, the embodiment of FIG. 4 is provided with two attachment openings 5*a* on portions of the lid corresponding to positions on opposite sides of the outlet opening 4. That is, the attachment openings do not coincide with the outlet opening 4, when the lid 5 is in place. The border 3, particularly the recess 3*b* thereof, is provided with attachment studs 3*c* with a position and shape corresponding to the attachment openings 5*a*.

Figure 5:
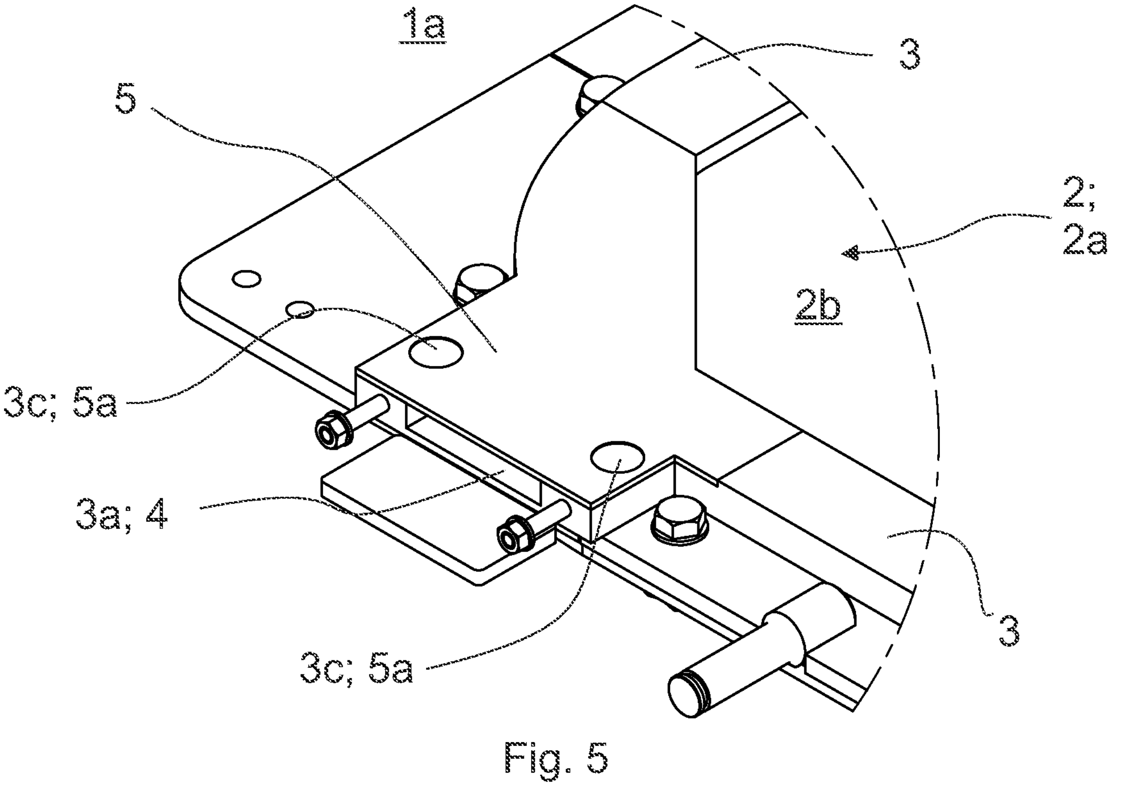
FIG. 5 illustrates the outlet region of FIG. 3 as a perspective in an assembled configuration.

Furthermore, FIG. 5 illustrates the outlet region of FIG. 3 and FIG. 4 as a perspective view in an assembled configuration, i.e. the lid 5 being attached in place over the outlet opening 4. The lid 5 and the recess 3*b* have corresponding shapes, such that the lid 5 is received within the recess 3*b* form-fittingly. Particularly, the lid 5 is received within the recess 3*b*, such that the surface of the lid 5 facing the side 1*a* opposing the base 2*b* is flush with the surface of the border 3 adjacent to the recess 3*b*. Moreover, the attachment studs 3*c* are received within the attachment openings 5, thereby securing alignment and position of the lid 5 with respect to the outlet opening.

Figure 6:
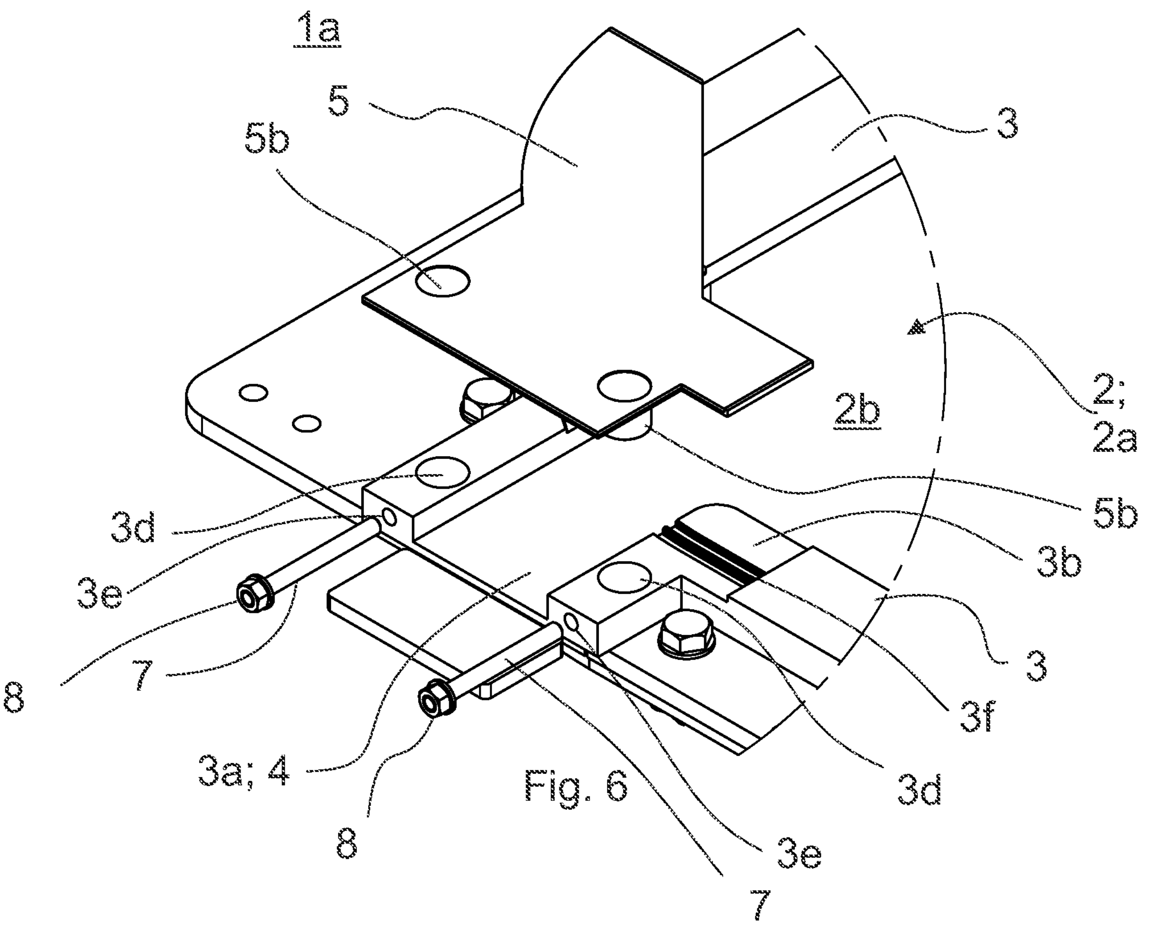
FIG. 6 illustrates the outlet region of FIG. 3 as a perspective in an exploded configuration, according to an alternative embodiment of the present disclosure.

FIG. 6 illustrates the outlet region of FIG. 3 as a perspective in an exploded configuration, according to an alternative embodiment of the present disclosure. Particularly, the embodiment of FIG. 6 differs from that of FIG. 4 in that attachment studs 5*b* are provided on the lid 5, whereas corresponding attachment openings 3*d* are provided on the recessed portions 3*b* of the border 3. Moreover, the recess 3*b* on the border 3 is provided with a sealing groove 3*f* extending along the longitudinal direction of the border 3 at the recess. That is, the sealing groove 3*f* is transverse to an anticipated force exerted on the border by a filtration pressure during operation. Additionally, FIG. 6 illustrates first locking holes 3*e* on the laterally outer surface of the border 3 adjacent to, and on both sides of the gap 3*a*. Although not visible form FIG. 6 the first locking holes 3*e* extend up to their respective attachment openings 3*d*. Locking pins 7 insertable into the first locking holes are also illustrated.

Figure 7:
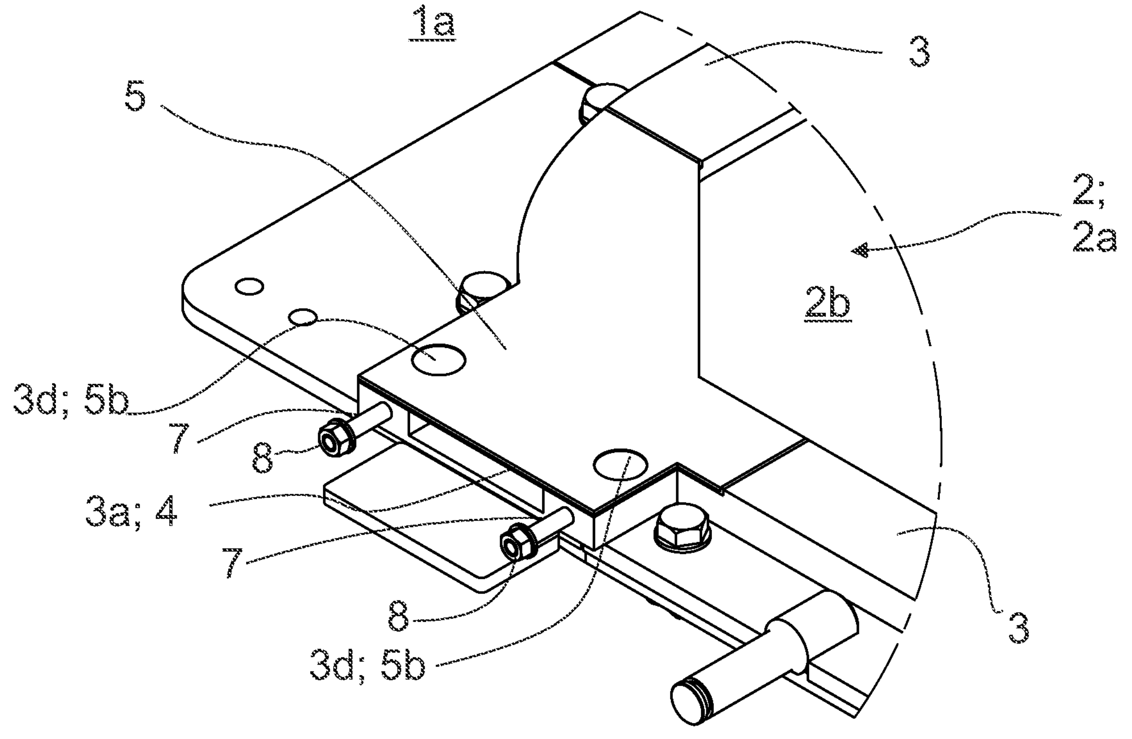

FIG. 7 illustrates the arrangement of FIG. 6 in an assemble state. That is, the lid is received within the recess 3*b*, such that the sealing ridge 5*e* of the lid 5 is received within the sealing groove 3*f* on recess 3*b* of the border 3. Furthermore, attachment studs 5*b* are received within the attachment openings 3*d*, and the locking pins 7 are inserted into the second locking holes 5*c* (not visible in FIG. 7) through the first locking holes 3*e*.

Figure 8:
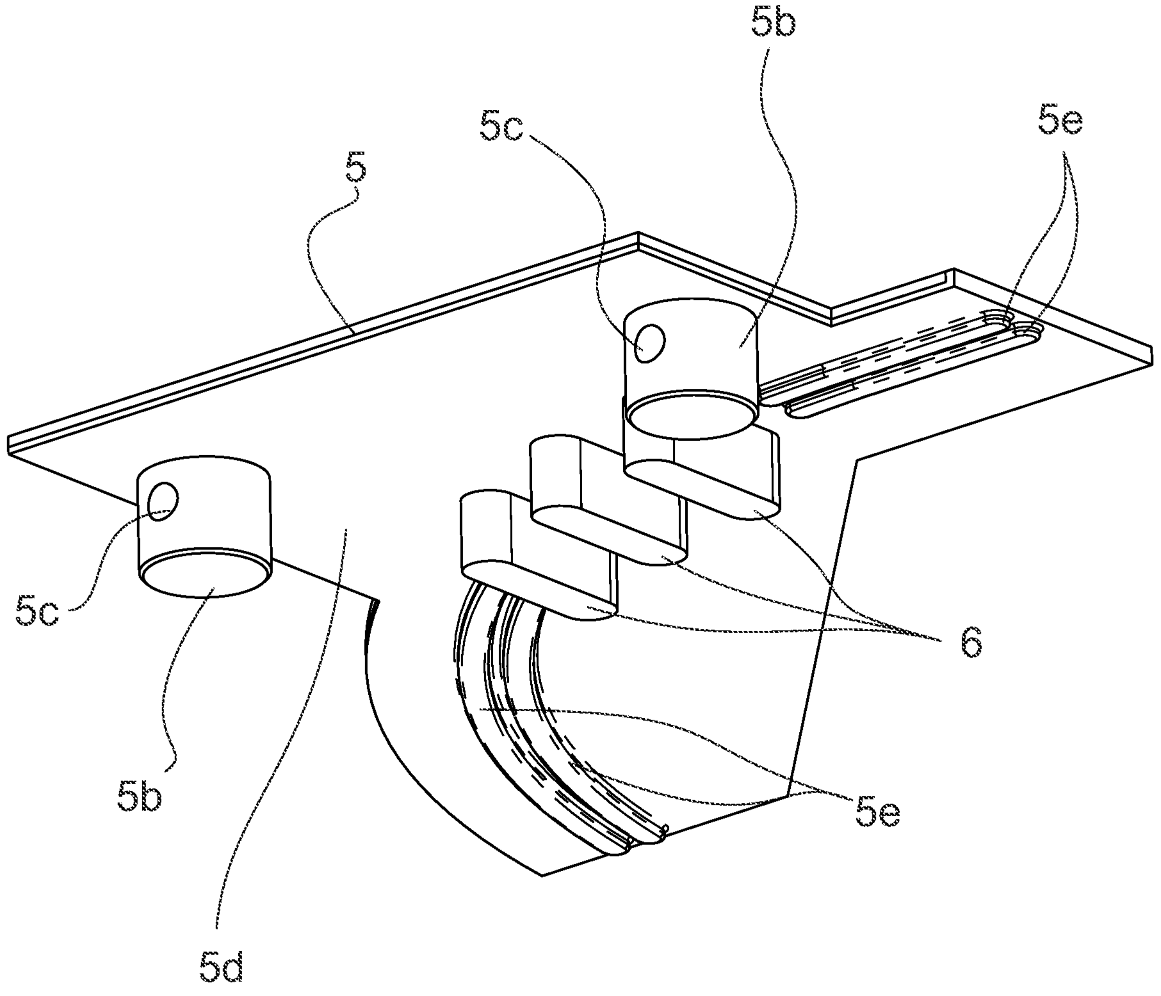
FIG. 8 illustrates a lid according to an embodiment illustrated in FIG. 6 and FIG. 7, as seen from a side facing the outlet opening.

FIG. 8, in turn, illustrates a lid according to an embodiment illustrated in FIG. 6 and FIG. 7, as seen from a side facing the outlet opening 4. Particularly, a gasket 5*d* is provided on said surface of the lid 5. A plurality of ribs 6 are provided protruding from said surface of the lid 5, through corresponding holes provided on the gasket 5*d*. Also, two attachment studs are provided protruding from said surface of the lid 5, through corresponding holes provided on the gasket 5*d*. Each attachment stud 3*c* is provided with a respective second locking hole 5*c* open towards an outside of the outlet opening 4. Furthermore, the gasket 5*d* is equipped with two parallel rows of sealing ridges 5*e* on each side of the outlet opening. Although not illustrated in FIG. 7, the locking pins 7 are advantageously threadedly engaged with their respective second locking holes 5*c*. Bolts 8 may suitably be provided on the distal ends of the locking pin 7, advantageously threadedly engaged thereto, example for attaching a further component, such as a collector element to the filtrate vat assembly.

Although the present disclosure is discussed above with reference to drawings illustrating an embodiment where the filtrate vat assembly is configured for a filter press having horizontal filter chambers, the present disclosure also encompasses embodiments arranged for other types of filter press configurations, such as filter presses having vertical filter chambers.

LIST OF REFERENCE NUMERALS

1 filtrate vat assembly
1*a* side opposing base
2 filtrate vat
2*a* receptacle
2*b* base of receptacle
3 border
3*a* gap

3*b* recess
3*c* attachment stud
3*d* attachment opening
3*e* first locking hole
3*f* sealing groove
4 outlet opening
5 lid
5*a* attachment opening
5*b* attachment stud
5*c* second locking hole
5*d* gasket
5*e* sealing ridge
6 rib
7 locking pin
8 bolt

The invention claimed is:

1. A filtrate vat assembly for a filter press, comprising:

a filtrate vat defining a receptacle being laterally delimited by a border elevated from a base of the receptacle and open towards a side opposing the base, wherein a gap is provided on the border, such that an outlet opening extending laterally through the border is formed, thereby providing a fluid drainage route from the receptacle, the gap being open towards the side opposing the base, and wherein the filtrate vat assembly further comprises a lid covering the outlet opening from the side opposing the base, such that the outlet opening is delimited by the border and the lid.

2. The filtrate vat assembly according to claim 1, wherein a recess is formed on a surface of the border facing the side opposing the base, adjacent to the gap, such that the lid is received into the recess, so that a surface of the lid facing the side opposing the base is flush with a surface of the border adjacent to the recess.

3. The filtrate vat assembly according to claim 1, wherein at least a side of the lid facing the outlet opening is coated with a wear resistant material, chosen from a group comprising wear resistant polymers, including thermoplastics, PUR (polyurethane) and rubber.

4. The filtrate vat assembly according to claim 3, wherein a gasket is provided on the side of the lid facing the outlet opening, said gasket constituting a wear resistant coating.

5. The filtrate vat assembly according to claim 2, wherein a sealing groove is provided at the recess, the sealing groove running along a lengthwise direction of the border at a position of the recess, and wherein a gasket is provided with a sealing ridge corresponding to the sealing groove, such that the sealing ridge is received within the sealing groove.

6. The filtrate vat assembly according to claim 1, wherein the lid is formed of a creep-resistant material, chosen from a group comprising metals, FRP (fibre-reinforce plastics) materials and thermoset materials.

7. The filtrate vat assembly according to claim 1, wherein the lid further comprises one or more ribs projecting from a side facing the outlet opening and extending between opposing lateral ends of the outlet opening.

8. The filtrate vat assembly according to claim 1, wherein a surface of the border facing the side opposing the base is provided with one or more attachment studs adjacent to the gap, and the lid is provided with one or more attachment openings corresponding to a shape and a position of the attachment studs wherein the attachment studs are received within the attachment openings so as to secure position and alignment of the lid with respect to the outlet opening.

9. The filtrate vat assembly according to claim 8, wherein two attachment studs and attachment openings are provided, one on each side of the gap.

10. The filtrate vat assembly according to claim 1, wherein a surface of the border facing the side opposing the base is provided with one or more attachment openings adjacent to the gap, and the lid is provided with one or more attachment studs corresponding to a shape and a position of the attachment openings wherein the attachment studs are received within the attachment openings so as to secure position and alignment of the lid with respect to the outlet opening.

11. The filtrate vat assembly according to claim 10, wherein a laterally outer surface of the border, adjacent to the gap, is equipped with a first locking hole extending up to the attachment opening, and the attachment stud received within said attachment opening is equipped with a second locking hole, wherein the first locking hole and the second locking hole are aligned and parallel with respect to each other, such that a locking pin inserted into the second locking hole through the first locking hole secures the lid in place.

12. The filtrate vat assembly according to claim 11, wherein two attachment studs and attachment openings are provided, one on each side of the gap.

13. The filtrate vat assembly according to claim 11, wherein one or more locking pins are threadedly engaged with a respective second locking hole.

14. The filtrate vat assembly according to claim 1, wherein the vat assembly is suitable for a horizontal filter press, and wherein the base of the filtrate vat forms a bottom thereof, and the side opposing the base constitutes an upper side, when in use.

15. A filter press, comprising the filtrate vat assembly according to claim 1.

* * * * *